United States Patent [19]

Ford et al.

[11] 3,886,095

[45] May 27, 1975

[54] CATALYST FOR THE REDUCTION OF AUTOMOBILE EXHAUST GASES

[75] Inventors: James A. Ford, North Haven, Conn.; Sheldon H. Butt, Godfrey, Ill.

[73] Assignee: Olin Corporation, New Haven, Conn.

[22] Filed: Nov. 12, 1973

[21] Appl. No.: 414,783

Related U.S. Application Data

[63] Continuation-in-part of Ser. No. 342,271, March 16, 1973, Pat. No. 3,810,754.

[52] U.S. Cl............. 252/455 R; 252/454; 252/459; 252/466 J; 252/474; 423/213.2; 423/213.5
[51] Int. Cl. ...................... B01j 11/06; B01j 11/22
[58] Field of Search............ 252/455 R, 465, 466 J; 423/213.2, 213.5

[56] References Cited

UNITED STATES PATENTS

| | | | |
|---|---|---|---|
| 3,565,574 | 2/1971 | Kearby et al. | 252/474 X |
| 3,718,733 | 2/1973 | Gehri | 423/213.2 |
| 3,773,894 | 11/1973 | Bernstein et al. | 252/474 X |

*Primary Examiner*—Winston A. Douglas
*Assistant Examiner*—W. J. Shine
*Attorney, Agent, or Firm*—Robert H. Bachman

[57] ABSTRACT

A catalyst for the reduction of automobile pollution and a method for forming the same are described. The catalyst comprises a nickel alloy substrate having a specified composition and a surface layer containing from 10 to 50% copper. The surface layer may be applied by pressure welding or by electroplating.

17 Claims, 6 Drawing Figures

PATENTED MAY 27 1975  3,886,095

3,886,095

CATALYST FOR THE REDUCTION OF AUTOMOBILE EXHAUST GASES

CROSS REFERENCE TO RELATED APPLICATION

This case is a continuation-in-part of copending application Ser. No. 342,271 by James A. Ford and Sheldon H. Butt for "Oxidation Resistant Nickel Base Alloys," filed Mar. 16, 1973, now U.S. Pat. No. 3,810,754.

BACKGROUND OF THE INVENTION

The field of automotive emission controls represents an area which is receiving a great deal of attention, particularly as government regulations concerning automotive pollution become more and more strict. It is now accepted that some sort of catalytic control system will be necessary in order that automobiles may meet future regulations, particularly with regard to emissions of oxides of nitrogen.

Potential catalysts must be evaluated from at least three view points; effectiveness, durability and cost. The catalysts systems proposed in the past have been deficient in one or more of the factors. Noble metal catalysts such as platinum or rhodium are effective and may be long lasting but they are extremely expensive while non-noble metal catalysts such as certain nickel base, stainless steel, and copper base alloys have not shown themselves to be durable enough for commercial use.

SUMMARY OF THE INVENTION

The present invention consists of a catalyst for use in a reduction of automotive pollution and a method for fabricating catalysts.

The catalysts described in the present application process a unique combination of effectiveness, durability and low cost. The catalysts of the present invention comprising a nickel base alloy substrate having extreme resistance to high temperature oxidation, nitridation and sulfidation, and a metallic layer on the surface of the substrate which comprises a nickel-copper alloy.

It is a primary object of the present invention to provide a highly effective catalyst for the reduction of oxides of nitrogen.

It is a further object of the present invention to provide a low cost catalyst for use in automotive pollution control systems.

Yet another object of the present invention is to provide a highly durable non-noble metal catalyst for the reduction of pollution.

DESCRIPTION OF THE PREFERRED EMBODIMENTS

Past research has demonstrated that alloys containing 50 to 90% nickel and 10 to 50% copper are effective catalysts. However, catalysts formed of nickel-copper alloys have been found to be subject to degradation during use and consequently have not been practical for use in long term applications. The observed degradation is a combination of surface and internal oxidation which occurs during use. Past attempts to overcome this problem include the application of a copper or a nickel layer to the surface of an oxidation resistant substrate. These attempts have been unsuccessful because the substrate is still subject to oxidation and is not protected by the surface layer. The ordinary substrate degrades by unusual internal oxidation when coated with copper or nickel-copper alloys. An additional observed effect is that during the high temperature exposure encountered during use the copper of the surface layer tends to diffuse into the substrate, thereby locally diluting the substrate and rendering it subject to oxidation attack. The preceeding discussion has dealt with the oxidation problem. In an actual operating situation there is also a form of attack due to the presence of sulfur and nitrogen in the exhaust gases. Past attempts which use a clad substrate material have generally been unsuccessful in resisting sulfidation and nitridation attack for the same reasons that they have failed to resist oxidation attack.

Figure 1:
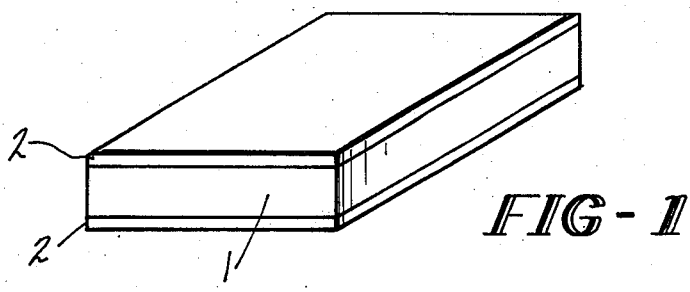
FIG. 1 shows the composite catalyst to the present invention, in its final form.

The composite catalyst of the present invention, as shown in FIG. 1, overcomes these difficulties by providing an oxidation resistant substrate 1 containing alloying constituents which are extremely resistant to oxidation, sulfidation and nitridation attack. The substrate constituents retain their oxidation resistance even when diluted by the diffusion of copper from the surface layers 2 into the substrate.

The oxidation resistant substrates used in the past have generally relied upon the presence of chromium for oxidation resistance for example, stainless steels and Nichrome and various nickel, iron and chromium alloys. Chromium, however, is extremely insoluble in pure copper and in nickel-copper alloys. The oxidation resistant substrate of the present invention comprises a nickel base alloy containing aluminum and silicon and optionally containing chromium. The solubilities are given in Table I.

TABLE I

| | Solid Solubilities Of Elements In Copper | | |
|---|---|---|---|
| | at 500°C | at 800°C | at 1000°C |
| Aluminum | 19 | 17 | 16 |
| Silicon | 9 | 4 | 4 |
| Chromium | .05 | .1 | .45 |

The increased solubility of these elements in copper as compared with chromium, indicates that they are better able to resist oxidation when diluted with copper than alloys containing major proportions of chromium. An additional benefit is that these alloying elements may diffuse into the surface layers 2 and protect them from oxdiation, sulfidation and nitridation.

The broad composition of this alloy substrate of the present invention is from 2 to 6% aluminum, from 0.5 to 4% silicon, from 0.001 to 6% chromium, from 0.001 to 0.4% manganese, from 0.001 to 1% magnesium, with the balance being nickel. The chromium addition serves mostly to increase the integrity and the oxidation-sulfidation resistance of the substrate, and it contributes little if anything to the oxidation-sulfidation resistance of the surface layer. The manganese eliminates the tendency which nickel base alloys have to crack during hot rolling and the magnesium serves as a deoxidizing agent. A preferred composition range for the substrate is from 3 to 5% aluminum, from 1.5 to 3.55 silicon, from 2 to 5% chromium. Alloys falling within this composition range possess a particularly desirable combination of oxidation resistance, sulfidation resistance, and high temperature mechanical properties.

The metallic surface layer of the catalyst of the present invention, contains from 10 to 50% copper, from 50 to 90% nickel, preferably from 20 to 40% copper and 60 to 80% nickel. Additionally, the following alloying additions may be made; from 0.0 to 8% aluminum, and from 0.0 to 6% silicon. Either aluminum or silicon may be present in amounts as low as 0.001%.

The surface layer may be applied in a variety of different ways. For example, a layer of copper-nickel alloy may be electroplated on the nickel base alloy substrate. Co-deposition electroplating techniques may be used with the thickness of the coating being from 100 A to 0.05 inch. FIG. 1 shows copper-nickel plate layers 2 applied to the edges of substrate 1. Electroplating techniques which may be used to co-deposit copper and nickel are well known in the art. See for example, Metal Finishing, Vol. 64, March 1969. If the surface layers are applied by electroplating, it may be difficult to include aluminum and silicon within the surface layers 2. In this case, a small amount of these elements may diffuse into the surface layers 2 during high temperature exposure.

Other techniques may be used to form the surface layer 2 on the substrate 1. An example is the use of a technique such as plasma spraying of metal powder onto the surface of the substrate 2. Another practical technique consists of vapor deposition of the surface layer 2 on the substrate 1 in a vacuum. Any technique resulting in adherent layer of the correct thickness and composition may be used.

Figure 2:
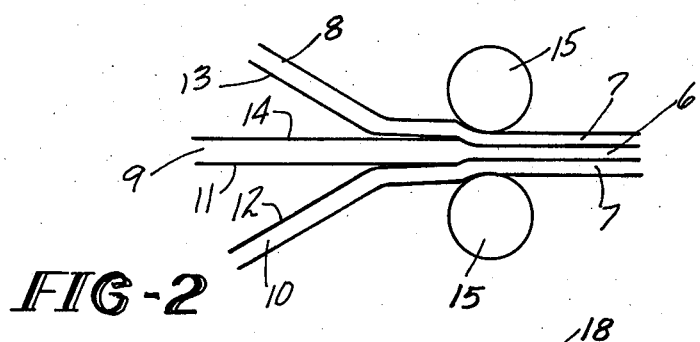
FIG. 2 shows in schematic form, the production of a composite catalytic material by a pressure welding process.

Yet another preferred method by which the surface layer may be applied is by pressure welding strips of metal together, as shown in FIG. 2, to form a composite material having a central core of nickel alloy substrate 6 material and having layers of catalytic material 7, 7 integrally bonded to the major surfaces of the substrate. The pressure welding process is a comparatively simple one in which the strips of metal 8, 9, 10 are arranged so that the major surfaces 11, 12, 13, 14 of the strips come in contact with each other with the surfaces which are in contact having been mechanically or chemically cleaned. The strips of metal are then subject to welding by pressure for example by passing them through a rolling mill 15 so that the strips of metal 8, 9, 10 are bonded together. In the case of the present invention the central core 6 would be composed of nickel base alloy containing silicon, aluminum and optionally containing chromium and the surface layers 7, 7 would be composed of copper, or nickel-copper alloy of the desired composition. Representative patents which describe the pressure welding process are U.S. Pat. Nos. 3,397,045 and 3,634,926, both issued to Joseph Winter.

Regardless of the technique used to apply the surface layer of nickel-copper alloy of the desired composition, the thickness of the layer should be within the limits cited previously in regard to electroplating, from 100 A to 0.05 inch.

After the surface layers have been applied and the heat treatment step performed, the composite may be oxidized to form the catalytic layer. The oxidation process may be performed over a wide temperature range. It is preferred that the oxidation be performed at a temperature of between 200° and 600°C for a time period of from 1 minute to 2 hours. The thickness of the oxide layer formed in this manner will be from 100 A to 1,000 A. Alternatively, the oxidation step may be performed in situ by exposure to exahust gases during use.

The preceeding discussion has assumed that it would be desirable to form a catalytic surface on both sides of the substrate 2. Of course this may not always be true, for example it may be desirable to fabricate a muffler shell with an internal catalytic surface. In this case it would not be necessary to plate both sides of the substrate.

The composition catalyst of the present invention may be formed into a large variety of mechanical shapes depending upon the desired application. It is desirable that the catalyst have a high ratio of surface area to mass. A particularly desirable physical form for the catalyst is a form known as expanded mesh.

Figure 3:
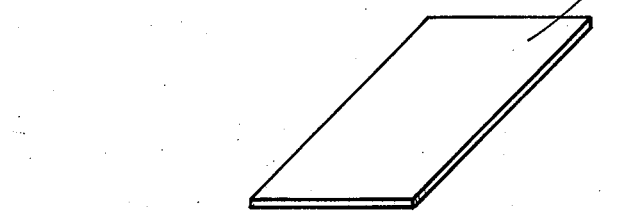
FIG. 3 shows a blank from which expanded metal mesh may be made.
Figure 4:
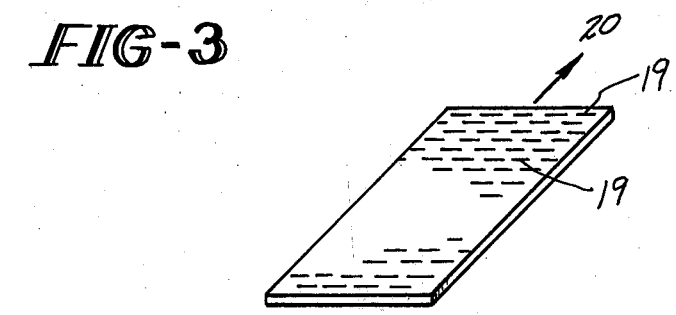
FIG. 4 shows the blank of FIG. 5 after it has been slit.
Figure 5A:
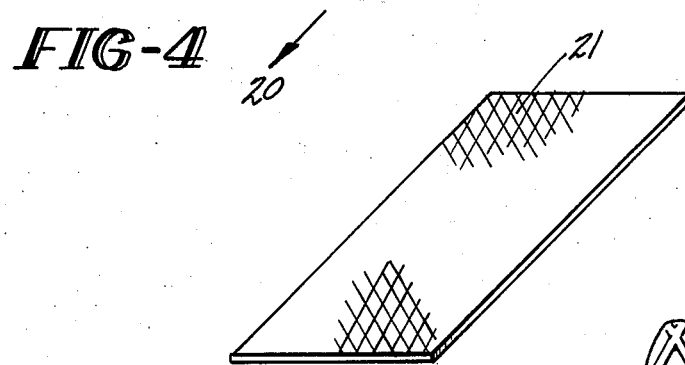
FIGS. 5a and 5b shows expanded mesh which has been produced from the slit blank shown in FIG. 4.
Figure 5B:
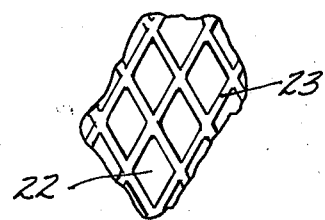

FIGS. 3, 4, 5a and 5b show steps in the production of expanded mesh. FIG. 3 shows a strip of metal 18, the raw material from which a strip of metal is produced. A series of slits 19 are punched or cut through the metal strip as shown in FIG. 4. The slits have a length to width ratio on the order of 10 to 1. The long axis of all the slits are parallel. A tensile force is applied longitudinally along the strip, in a direction perpendicular to the long axis of the slits, as shown by the arrows, 20. The tensile force expands the slits S resulting in a porous mesh 21 as shown in FIG. 5a having a plurality of openings 22, defined by metal strips 23 as shown in FIG. 5b. The use of an expanded mesh form for the catalyst of the present invention has several highly desirable advantages. Expanded mesh has a high ratio of surface area to weight, thereby providing increased catalytic activity per unit weight of catalyst material. Expanded mesh is particularly adaptable for use in applications such as automobile catalytic converters wherein high flow rates of exhaust gases must be maintained. Expanded mesh also has a comparatively low heat capacity relative to its surface area and reaches operating temperature rapidly. Finally, the production of expanded mesh is economical since there is no scrap or waste material produced by the process.

The production of the expanded mesh could be performed at any one of several stages during the production of the catalyst of the present invention, depending upon the method used to apply the surface layer. If the surface layer is applied by a plating process the expanded mesh is preferably produced from the substrate material prior to the plating operation. In this way the entire exposed area of substrate may be coated with the catalytic alloy leading to improved catalytic efficiency.

Of course any form or shape having a high ratio of surface area to volume may be employed. For example, the nickel alloy substrate of the present invention may be formed into particles, short lengths of wire, or small strips. These small pieces may then be coated with copper-nickel and sintered together during the heat treatment process to form a porous catalytic body. If the small shapes are not sintered together, they may be confined and arranged in such a way that the exhaust gases pass over their surface.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A composite catalyst for the reduction of automobile exhaust pollution comprising:
   A. a nickel alloy substrate containing from 2 to 6% aluminum, from 0.5 to 4% silicon, from 0.001 to 6% chromium, from 0.001 to 0.4% manganese, from 0.001 to 1% magnesium, balance essentially nickel; and
   B. a surface layer of copper-nickel alloy on said substrate, having a composition consisting essentially of from 10 to 50% copper and from 50 to 90% nickel, said surface layer having a thickness of from 100 A to 0.05 inches.

2. A catalyst as in claim 1 wherein the copper concentration in the surface layer is from 20 to 40%.

3. A catalyst as in claim 1 wherein the nickel alloy substrate contains from 3 to 5% aluminum.

4. A catalyst as in claim 1 wherein the nickel alloy substrate contains from 1.5 to 3.5% silicon.

5. A catalyst as in claim 1 wherein the nickel alloy substrate contains from 2 to 5% chromium.

6. A method for producing a composite catalyst comprising the steps of:
   A. providing a nickel alloy substrate, said alloy consisting of from 2 to 6% aluminum, from 0.5 to 4% silicon, from 0.001 to 6% chromium, from 0.001 to 0.4% manganese, from 0.001 to 1% magnesium with the balance being essentially nickel; and
   B. applying a surface layer of copper-nickel alloy, containing from 10 to 50% copper, to the surface of the substrate, said layer having a thickness of from 100 A to 0.05 inches.

7. A method as in claim 1 wherein the copper concentration in the surface layer of the catalyst varies from 20 to 40%.

8. A method as in claim 6 wherein the nickel alloy substrate contains from 3 to 5% aluminum.

9. A method as in claim 6 wherein the nickel alloy substrate contains from 1.5 to 3.5% silicon.

10. A method as in claim 6 wherein the nickel alloy substrate contains from 2 to 5% chromium.

11. A method as in claim 6 including the steps of heating the heat treated substrate surface layer in an oxidizing atmosphere at a temperature of between 200° and 600°C for a time period of from 1 minute to 2 hours.

12. A method as in claim 6 including the step of forming the substrate into expanded mesh prior to applying the copper-nickel alloy surface layer.

13. A method as in claim 6 wherein the copper-nickel alloy surface layer is applied to the substrate by a pressure welding process which comprises:
   A. providing a substrate material having at least one clean major surface;
   B. providing a surface alloy material having at least one clean major surface;
   C. arranging the substrate layer and the substrate layer so that the clean major surfaces come into contact; and
   D. pressure bonding the substrate and the surface layer by rolling.

14. A method as in claim 6 wherein the copper-nickel alloy surface layer is applied to the substrate by plasma spraying.

15. A method as in claim 6 wherein the copper-nickel surface is applied by an electroplating process.

16. A catalyst as in claim 1 wherein the surface layer contains from 0.001 to 8% aluminum and from 0.001 to 6% silicon.

17. A catalyst as in claim 6 wherein the surface layer contains from 0.001 to 8% aluminum and from 0.001 to 6% silicon.

* * * * *

UNITED STATES PATENT AND TRADEMARK OFFICE
CERTIFICATE OF CORRECTION

PATENT NO. : 3,886,095
DATED : May 27, 1975
INVENTOR(S) : James A. Ford and Sheldon H. Butt It is certified that error appears in the above-identified patent and that said Letters Patent are hereby corrected as shown below:

In Column 2, line 59, the word "oxdiation" should read ---oxidation---.

In Column 3, line 6, "3.55 silicon" should read ---3.5% silicon---.

In Column 4, line 12, the word "exahust" should read ---exhaust---.

In Column 6, line 1, after the word "claim" the numeral "1" should read ---6---;

In Column 6, line 39, the word "catalyst" should read ---method---.

Signed and Sealed this eighteenth Day of November 1975

[SEAL]

Attest:

RUTH C. MASON
Attesting Officer

C. MARSHALL DANN
Commissioner of Patents and Trademarks